(12) United States Patent
Kwack et al.

(10) Patent No.: US 10,005,928 B2
(45) Date of Patent: Jun. 26, 2018

(54) ADHESIVE COMPOSITION AND DISPLAY DEVICE

(71) Applicant: Samsung Display Co., Ltd., Yongin-si, Gyeonggi-do (KR)

(72) Inventors: Junho Kwack, Chungcheongnam-do (KR); Jongsung You, Asan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 224 days.

(21) Appl. No.: 14/884,589

(22) Filed: Oct. 15, 2015

(65) Prior Publication Data

US 2016/0145472 A1 May 26, 2016

(30) Foreign Application Priority Data

Nov. 24, 2014 (KR) .......... 10-2014-0164589

(51) Int. Cl.
| | | |
|---|---|---|
| *B32B 7/12* | (2006.01) | |
| *C09J 11/06* | (2006.01) | |
| *C09J 109/00* | (2006.01) | |
| *C09J 133/00* | (2006.01) | |
| *B32B 37/12* | (2006.01) | |

(52) U.S. Cl.
CPC ........... *C09J 109/00* (2013.01); *C09J 133/00* (2013.01); *B32B 7/12* (2013.01); *B32B 2037/1253* (2013.01); *B32B 2305/72* (2013.01); *B32B 2310/0831* (2013.01); *B32B 2457/20* (2013.01); *C09J 11/06* (2013.01)

(58) Field of Classification Search
None
See application file for complete search history.

(56) References Cited

U.S. PATENT DOCUMENTS

2014/0320770 A1* 10/2014 Motohashi .............. G03F 7/027
349/12

FOREIGN PATENT DOCUMENTS

| KR | 10-2006-0124431 A | 12/2006 | |
|---|---|---|---|
| KR | 10-2010-0110173 A | 10/2010 | |
| KR | 10-2012-0087659 A | 8/2012 | |
| KR | 10-2013-0001894 A | 1/2013 | |
| WO | WO-2013105162 A1 * | 7/2013 | .............. G03F 7/027 |

* cited by examiner

*Primary Examiner* — Ramsey E Zacharia
(74) *Attorney, Agent, or Firm* — Knobbe Martens Olson & Bear LLP

(57) ABSTRACT

Disclosed are an adhesive composition that includes: a first photopolymerization initiator having a maximum absorption wavelength in a range of about 350 nm to about 370 nm and a second photopolymerization initiator having a maximum absorption wavelength in a range of about 380 nm to about 390 nm, and a method of manufacturing a display device.

6 Claims, 3 Drawing Sheets

ADHESIVE COMPOSITION AND DISPLAY DEVICE

RELATED APPLICATION

Any and all priority claims identified in the Application Data Sheet, or any correction thereto, are hereby incorporated by reference under 37 CFR 1.57. For example, this application claims priority to and the benefit of Korean Patent Application No. 10-2014-0164589, filed on Nov. 24, 2014 with the Korean Intellectual Property Office, the disclosure of which is incorporated herein in its entirety by reference.

BACKGROUND

Field

The disclosure relates to an adhesive composition and a display device prepared using the adhesive composition.

Description of the Related Technology

Display devices display images using light emitting elements. In recent years, flat panel display (FPD) devices are widely used as the display devices, the most representative of which include a liquid crystal display (LCD) device, a field emission display (FED), a plasma display panel (PDP), and an organic light emitting diode (OLED) display device.

Such display devices may include a display panel for displaying images and a window for protecting the display panel. In general, the display panel and the window may be attached to each other by an adhesive layer. Such an adhesive layer may include an adhesive composition and research has been conducted on various adhesive compositions which may allow stable adhesion between the display panel and the window.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Some embodiments are directed to an adhesive composition including a short wavelength photopolymerization initiator and a long wavelength photopolymerization initiator.

Some embodiments are also directed to a method of manufacturing a display device utilizing an adhesive composition including a short wavelength photopolymerization initiator and a long wavelength photopolymerization initiator.

Some embodiments are also directed to a display device including an adhesive layer composed of an adhesive composition including a short wavelength photopolymerization initiator and a long wavelength photopolymerization initiator.

In some embodiments, an adhesive composition may include: a monomer in an amount of about 15 percentage by weight (wt %) to about 30 wt % with respect to the total weight of the adhesive composition; an oligomer in an amount of about 20 wt % to about 40 wt % with respect thereto; a rubber-based elastic component in an amount of about 25 wt % to about 50 wt % with respect thereto; and a photopolymerization initiator in an amount of about 2 wt % to 7 wt % with respect thereto. In some embodiments, the photopolymerization initiator may include a first photopolymerization initiator having a photo-sensitive range of a wavelength from about 350 nm to about 370 nm and a second photopolymerization initiator having a photo-sensitive range of a wavelength from about 380 nm to about 390 nm. In some embodiments, the first photopolymerization initiator and the second photopolymerization initiator may have a content ratio (i.e., weight ratio) of about 5~2:1.

In some embodiments, the first photopolymerization initiator may be represented by at least one of the following Chemical Formulas 1 through 3:

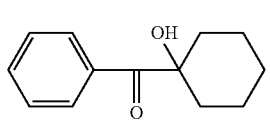

Chemical Formula 1

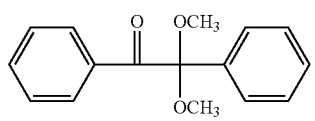

Chemical Formula 2

Chemical Formula 3

In some embodiments, the second photopolymerization initiator may be represented by the following Chemical Formula 4:

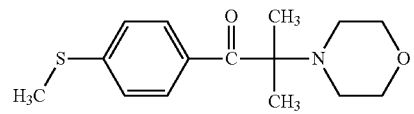

Chemical Formula 4

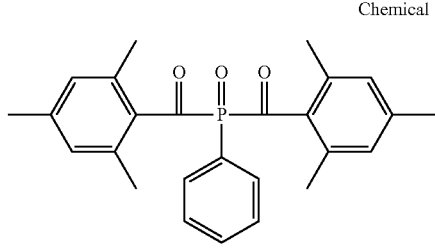

In some embodiments, the monomer may be at least one selected from the group consisting of isobornyl acrylate, n-octyl acrylate, tetrahydrofurfuryl acrylate, and 4-hydroxy butyl acrylate.

In some embodiments, the oligomer may be at least one selected from the group consisting of urethane (meth)acrylate and ester (meth)acrylate that have a weight average molecular weight (Mw) in a range of about 5,000 Mw to about 50,000 Mw. In some embodiments, the oligomer may be at least one selected from the group consisting of urethane (meth)acrylate and ester (meth)acrylate that does not have a weight average molecular weight (Mw) of less than 5,000 Mw. In some embodiments, the oligomer may be at least one selected from the group consisting of urethane (meth)acrylate and ester (meth)acrylate that does not have a weight average molecular weight (Mw) of greater than 50,000 Mw. In some embodiments, the oligomer may be at least one selected from the group consisting of urethane (meth)acrylate and ester (meth)acrylate that does not have a weight average molecular weight (Mw) of less than 5,000 Mw and greater than 50,000 Mw.

In some embodiments, the rubber-based elastic component may be at least one selected from the group consisting of polybutadiene and polyisoprene that have a weight average molecular weight (Mw) in a range of about 10,000 Mw to about 100,000 Mw. In some embodiments, the rubber-based elastic component may be at least one selected from the group consisting of polybutadiene and polyisoprene that does not have a weight average molecular weight (Mw) of less than 10,000 Mw. In some embodiments, the rubber-based elastic component may be at least one selected from the group consisting of polybutadiene and polyisoprene that does not have a weight average molecular weight (Mw) of greater than 100,000 Mw. In some embodiments, the rubber-based elastic component may be at least one selected from the group consisting of polybutadiene and polyisoprene that does not have a weight average molecular weight (Mw) of less than 10,000 Mw and greater than 100,000 Mw.

Some embodiments provide a method of manufacturing a display device that includes: coating an adhesive composition on a surface of a display panel; performing a first curing of the adhesive composition using a first light source; disposing a window on the adhesive composition subject to the first curing and compressing the window toward the display panel; and performing a second curing of the adhesive composition subject to the first curing by irradiating light on the window using a second light source. In some embodiments, the adhesive composition may include: a monomer in an amount of about 15 wt % to about 30 wt % with respect to the total weight of the adhesive composition; an oligomer in an amount of about 20 wt % to about 40 wt % with respect thereto; and a rubber-based elastic component in an amount of about 25 wt % to about 50 wt % with respect thereto; a photopolymerization initiator in an amount of about 2 wt % to 7 wt % with respect thereto. In some embodiments, the photopolymerization initiator may include a first photopolymerization initiator having a photo-sensitive range of a wavelength from about 350 nm to about 370 nm and a second photopolymerization initiator having a photo-sensitive range of a wavelength from about 380 nm to about 390 nm, the first photopolymerization initiator and the second photopolymerization initiator have a content ratio (i.e., weight ratio) of about 5~2:1, and the second light source emits light having a wavelength longer than that of the first light source.

In some embodiments, the first light source may emit an ultraviolet ray having a wavelength in a range of about 350 nm to about 370 nm.

In some embodiments, the second light source may emit an ultraviolet ray having a wavelength in a range of about 380 nm to about 390 nm.

Some embodiments provide a display device that includes: a display panel; an adhesive layer on the display panel; and a window on the adhesive layer. In some embodiments, the adhesive layer may include an adhesive polymer resin, a rubber-based elastic component, and a photopolymerization initiator. In some embodiments, the photopolymerization initiator may include a first photopolymerization initiator having a maximum absorption wavelength in a range of about 350 nm to about 370 nm and a second photopolymerization initiator having a maximum absorption wavelength in a range of about 380 nm to about 390 nm.

In some embodiments, the adhesive layer may have: an elasticity in a range of about 0.10 Mpa to about 0.30 Mpa; an elongation index in a range of about 100% to about 300%; a refractive index in a range of about 1.49 to about 1.53; a transmittance more than about 92%; and a glass transition temperature in a range of about $-10°$ C. to about $-5°$ C.

In some embodiments, the display panel may be one of a liquid crystal display panel and an organic light emitting diode display panel.

Some embodiments provide an adhesive composition may include a short wavelength photopolymerization initiator and a long wavelength photopolymerization initiator, and may show high efficiency in curing.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which.

DETAILED DESCRIPTION

Figure 1:
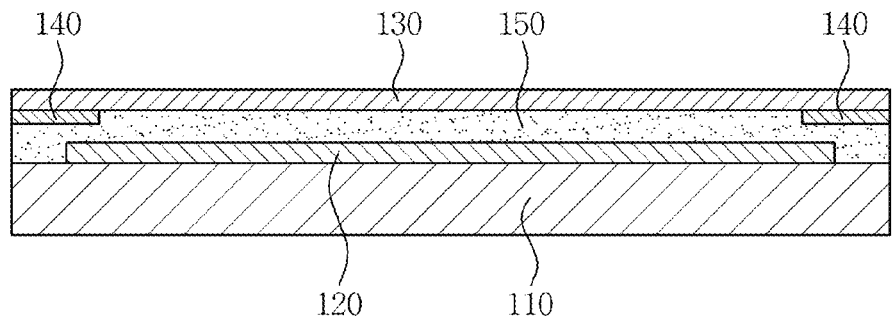
FIG. 1 is a cross-sectional view illustrating a display device according an embodiment.

Hereinafter, specific embodiments of the present disclosure will now be described in more detail with reference to the accompanying drawings. The embodiments may, however, be represented in many different forms and should not be construed as being limited to the specific embodiments set forth herein. Rather, these specific embodiments are provided so that this disclosure will be thorough and complete, and will fully convey the scope of the embodiments to those skilled in the art.

All terminologies used herein are merely used to describe certain embodiments and may be modified according to the relevant art. Therefore, the terms used herein should be interpreted as having a meaning that is consistent with their meanings in the context of the present disclosure, and is not intended to limit the embodiments.

In the drawings, certain elements or shapes may be simplified or exaggerated to better illustrate the present invention, and other elements present in an actual product may also be omitted. Thus, the drawings are intended to facilitate the understanding of the present embodiments. Like reference numerals refer to like elements throughout the specification.

In addition, when a layer or element is referred to as being "on" another layer or element, the layer or element may be directly on the other layer or element, or one or more intervening layers or elements may be interposed therebetween.

Some embodiments provide an adhesive composition that may have photopolymerization properties.

In some embodiments, the adhesive composition may include: a monomer in an amount of about 15 percentage by weight (wt %) to about 30 wt % with respect to the total weight of the adhesive composition; an oligomer in an amount of about 20 wt % to about 40 wt % with respect thereto; a rubber-based elastic component in an amount of about 25 wt % to about 50 wt % with respect thereto; and a photopolymerization initiator in an amount of about 2 wt % to 7 wt % with respect thereto.

In some embodiments, a monofunctional monomer and a polyfunctional monomer may be used as the monomer.

In some embodiments, the monofunctional monomer may include nonylphenyl carbitol acrylate, 2-hydroxy-3-phenoxypropylacrylate, 2-ethylhexylcarbitolacrylate, 2-hydroxyethylacrylate, N-vinylpyrrolidone (NVP), and the like.

In some embodiments, the polyfunctional monomer that has two or more reactive groups may include 1,6-hexandiol di(meth)acrylate, ethyleneglycol di(meth)acrylate, neopentylglycol di(meth)acrylate, triethyleneglycol di(meth)acrylate, bisphenol A bis(acryloyloxyethyl)ether, 3-methylpentanediol di(meth)acrylate, and the like.

In some embodiments, the polyfunctional monomer may include trimethylolpropane tri(meth)acrylate, ethoxylated trimethylolpropane tri(meth)acrylate, propoxylated trimethylolpropane tri(meth)acrylate, pentaerythritol tri(meth)acrylate, pentaerythritol tetra(meth)acrylate, dipentaerythritol penta(meth)acrylate, ethoxylated dipentaerythritol hexa(meth)acrylate, propoxylated dipentaerythritol hexa(meth)acrylate, dipentaerythritol hexa(meth)acrylate, and the like.

In some embodiments, the term "(meth)acrylate" may refer to one of acrylate and methacrylate or may refer to a combination of acrylate and methacrylate.

In some embodiments, at least one of isobornyl acrylate, n-octyl acrylate, tetrahydrofurfuryl acrylate, and 4-hydroxybutylacrylate, for example, may be used as the monomer.

In some embodiments, the monomer may be used alone or in combination of two or more thereof.

In some embodiments, the monomer may be present in an amount of about 15 wt % to about 30 wt % with respect to the total weight of the adhesive composition. In a case where the amount of the monomer is in a range of about 15 wt % to about 30 wt %, the adhesive composition may be readily cured by light exposure. In a case where the amount of the monomer is less than about 15 wt %, the efficiency of photopolymerization may decrease. In a case where the amount of the monomer is more than about 70 wt %, the strength of the adhesive layer formed by curing of the adhesive composition may be reduced.

In some embodiments, at least one of urethane (meth)acrylate and ester (meth)acrylate having an average molecular weight (Mw) of about 5,000 Mw to about 50,000 Mw may be used as the oligomer.

In a case where the average molecular weight (Mw) of the oligomer is more than 50,000 Mw, the adhesion composition may show poor adhesion properties on an interface when being attached to an adherend, and may become opaque in a high temperature and high humidity environment. In a case where the average molecular weight (Mw) of the oligomer is less than 5,000 Mw, it may be difficult for the adhesion composition to maintain a solid state at room temperature. Herein, "average molecular weight (Mw)" in the first exemplary embodiment refers to an average molecular weight measured by gel permeation chromatography (GPC) based on polystyrene standards.

In some embodiments, urethane (meth)acrylate may be used as the oligomer. In some embodiments, the urethane (meth)acrylate may be prepared by reaction of a polyol compound having at least two hydroxyl groups in the molecule, a compound having two or more isocyanate groups in the molecule, and a (meth)acrylate having at least one hydroxyl group in the molecule.

In some embodiments, the polyol compound having two or more hydroxyl groups in the molecule may include, for example, polyether polyol, polyester polyol, caprolactone diol, bisphenol polyol, polyisoprene polyol, hydrogenated polyisoprene polyol, polybutadiene polyol, hydrogenated polybutadiene polyol, castor oil polyol, and/or polycarbonate diol, which may be used alone or in combination of two or more thereof.

In some embodiments, the compound having two or more isocyanate groups in the molecule may include, for example, an aromatic polyisocyanate, an alicyclic polyisocyanate, and an aliphatic polyisocyanate, which may be used alone or in combination of two or more thereof.

In some embodiments, a (meth)acrylate having at least one hydroxyl group in the molecule may include: mono(meth)acrylate of dihydric alcohols, such as ethylene glycol, propylene glycol, 1,3-propanediol, 1,3-butanediol, 1,4-butanediol, and polyethylene glycol; mono(meth)acrylate of trihydric alcohols, such as trimethylolethane, trimethylolpropane, and glycerin; and/or di(meth)acrylates, which may be used alone or in combination of two or more thereof.

In some embodiments, the oligomer may account for about 20 wt % to about 40 wt % of the total weight of the adhesive composition. In a case where the amount of the oligomer is in a range of about 20 wt % to about 40 wt %, the adhesive composition may be readily cured and the adhesive layer, which is formed by curing of the adhesive composition, may have suitable strength and flexibility.

In some embodiments, at least one of polybutadiene and polyisoprene having an average molecular weight (Mw) of about 10,000 Mw to about 100,000 Mw may be used as the rubber-based elastic component. The rubber-based elastic component may impart flexibility to the adhesive layer formed by the adhesive composition. When the average molecular weight (Mw) is in a range of about 10,000 Mw to about 100,000 Mw, the adhesive composition may have stable fluidity.

In some embodiments, the rubber-based elastic component may account for about 25 wt % to about 50 wt % of the total weight of the adhesive composition. In a case where the amount of the rubber-based elastic component is less than about 25 wt %, the permittivity and refractive index of the adhesive composition may be unnecessarily high. In a case where the amount of the rubber-based elastic component is more than about 50 wt %, the strength of the adhesive layer, which is formed by curing of the adhesive composition, may decrease.

The photopolymerization initiator may absorb activation energy rays (e.g., ultraviolet rays) and generate radicals. The radicals generated from the photopolymerization initiator may react with a monomer and an oligomer to initiate a polymerization reaction of the adhesive composition. Along with the polymerization reaction, bridging reaction may occur between the monomer, the oligomer, and the rubber-based elastic component. Since being subject to polymerization and bridging reactions, the adhesive composition may be cured. Accordingly, an adhesive layer may be formed by the curing of the adhesive composition.

In some embodiments, the photopolymerization initiator may include a first photopolymerization initiator having a photo-sensitive range of a wavelength from about 350 nm to about 370 nm and a second photopolymerization initiator having a photo-sensitive range of a wavelength from about 380 nm to about 390 nm. In some embodiments, the first photopolymerization initiator may also be referred to as a short wavelength photopolymerization initiator; and the second photopolymerization initiator may also be referred to as a long wavelength photopolymerization initiator. For example, the first photopolymerization initiator may absorb light having a wavelength of about 365 nm to generate radicals, and the second photopolymerization initiator may absorb light having a wavelength of about 385 nm to generate radicals.

In some embodiments, the first photopolymerization initiator may function as a polymerization initiator in a pre-curing process of the adhesive composition using a short wavelength light having a wavelength in a range of about 350 nm to about 370 nm. In addition, the second photopolymerization initiator may function as a polymerization initiator in a main curing process of the adhesive composition using a long wavelength light having a wavelength in a range of about 380 nm to about 390 nm. In some embodiments, reactive groups that account for about 70% to about 80% of the total reactive groups of the adhesive composition may undergo reaction in the pre-curing process, and the rest of about 20% to about 30% thereof may undergo reaction in the main curing process. To this end, the first photopolymerization initiator and the second photopolymerization initiator may have a content ratio (i.e., weight ratio) in a range of about 5~2:1. In some embodiments, the weight of the first photopolymerization initiator may be about twice to five times the weight of the second photopolymerization initiator.

In some embodiments, the photopolymerization initiator may account for about 2 wt % to about 7 wt % of the total weight of the adhesive composition. In a case where the amount of the photopolymerization initiator is less than about 2 wt %, the photopolymerization property of the adhesive composition may decrease; and in a case where the amount of the photopolymerization initiator is more than about 7 wt %, the strength of the adhesive layer, which is formed by curing of the adhesive composition, may decrease.

In some embodiments, at least one compound represented by the following Chemical Formulas 1 through 3 may be used as the first photopolymerization initiator:

Chemical Formula 1

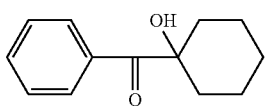

Chemical Formula 2

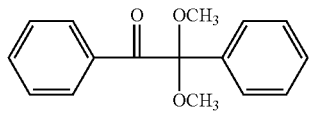

Chemical Formula 3

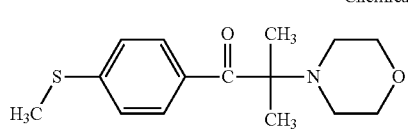

The name of the compound represented by Chemical Formula 1 is 1-hydroxycyclohexyl benzophenone. The name of the compound represented by Chemical Formula 2 is 2,2-dimethoxy-1,2-diphenylethan-1-one. The name of the compound represented by Chemical Formula 3 is 2-Methyl-1-[4-(methylthio)phenyl]-2-(4-morpholinyl)-1-propanone.

Apart from the compounds represented by the Chemical Formulas 1 through 3, different photopolymerization initiators that react in response to a light having a wavelength of about 365 nm may be used as the first photopolymerization initiator. In some embodiments, an adhesive composition including a short wavelength photopolymerization initiator and a long wavelength photopolymerization initiator only includes at least one compound represented Chemical Formulas 1 through 3 as the first photopolymerization initiator and does not include different photopolymerization initiators that react in response to a light having a wavelength of about 365 nm.

In some embodiments, a compound represented by the following Chemical Formula 4 may be used as the second photopolymerization initiator.

Chemical Formula 4

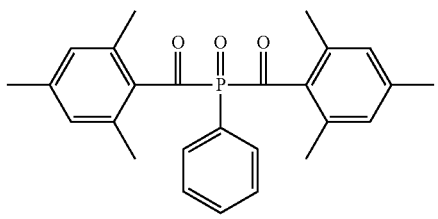

The name of the compound represented by Chemical Formula 4 is bis(2,4,6-trimethylbenzoyl)-phenylphosphineoxide.

Apart from the compounds represented by Chemical Formula 4, different photopolymerization initiators that react in response to a light having a wavelength of about 385 nm may be used as the second photopolymerization initiator. In some embodiments, an adhesive composition including a short wavelength photopolymerization initiator and a long wavelength photopolymerization initiator only includes Chemical Formula 4 as the second photopolymerization initiator and does not include different photopolymerization initiators that react in response to a light having a wavelength of about 385 nm.

In some embodiments, the adhesive composition may further include at least one of an amine compound and a carboxylic acid compound as a photopolymerization auxiliary initiator.

In some embodiments, the amine compound of the photopolymerization auxiliary initiator may include: for example, aliphatic amine compounds, such as triethanolamine, methyl diethanolamine, and triisopropanolamine; and aromatic amine compounds, such as methyl 4-dimethylamino benzoate, ethyl 4-dimethylamino benzoate, isoamyl 4-dimethylamino benzoate, 2-ethylhexyl 4-dimethylaminobenzoate, benzoic acid 2-dimethylaminoethyl, N,N-dimethyl-p-toluidine, 4,4'-bis (dimethylamino) benzophenone (e.i., Michler's ketone), and 4,4'-bis (diethylamino) benzophenone. In particular, the aromatic amine compounds, for example, may be used as the photopolymerization auxiliary initiator.

In some embodiments, the carboxylic acid compounds may include, for example, aromatic hetero acetic acids, such as phenylthio acetic acid, methylphenylthio acetic acid, ethyl phenylthio acetic acid, methyl ethyl phenylthio acetic acid, dimethyl phenyl thio acetic acid, methoxyphenylthio acetic acid, dimethoxyphenyl thio acetic acid, chlorophenylthio acetic acid, dichlorophenylthio acetic acid, N-phenylglycine, phenoxy acetic acid, naphthylthio acetic acid, N-naphthyl glycine, and naphthoxy acetic acid.

In some embodiments, the photosensitive resin composition may further include additives, where necessary. In some embodiments, the additives may include filing members, polymeric compounds, dispersing members, adhesion promoters, antioxidants, ultraviolet absorbers, and flocculation inhibitors.

Among the aforementioned additives, the ultraviolet absorbers may include, for example, 2-(3-tert-butyl-2-hydroxy-5-methylphenyl)-5-chlorobenzotriazole and alkoxy benzophenone. The ultraviolet absorbers may serve to absorb ultraviolet rays of the adhesive composition in the light-irradiation process.

In some embodiments, the adhesive composition may further include a photosensitizer.

The photosensitizer may absorb activation energy rays or radiation to enter an excited state, thereby improving photosensitivity of the adhesive composition. For example, a compound capable of absorbing light having a wavelength in a range of about 350 nm to about 450 nm may be used as the photosensitizer.

Hereinafter, another embodiment of the present disclosure will be described with reference to FIG. 1. FIG. 1 is a cross-sectional view illustrating a display device 102 according to a second exemplary embodiment.

In some embodiments, the display device 102 may include a display panel 110, an adhesive layer 150 on the display panel 110, and a window 130 on the adhesive layer 150.

In some embodiments, the display panel 110 may be a liquid crystal display panel or may be an organic light emitting display panel. In some embodiments, a polarizing plate 120 configured to prevent ambient light reflection may be disposed on the display panel 110. In some embodiments, the polarizing plate 120 may be omitted.

In some embodiments, the window 130 may be formed of transparent insulating materials, such as glass or plastics.

In some embodiments, a black matrix 140 may be disposed on an edge portion of the window 130. In some embodiments, the black matrix 140 may correspond to a bezel area.

In some embodiments, the adhesive composition may be cured, thereby forming an adhesive layer 150. For example, the adhesive layer 150 may include an adhesive polymer resin and a photopolymerization initiator dispersed in the adhesive polymer resin.

In some embodiments, a monomer, an oligomer, and a rubber-based elastic component of the adhesive composition may be polymerized and bridged, thereby forming the adhesive polymer resin. In this case, unreacted polymerization initiators may be present within the adhesive layer 150, in a dispersed manner in the adhesive polymer resin. In this regard, the photopolymerization initiator is described above in the first exemplary embodiment, and thus the detailed description will be omitted for brevity.

Since the adhesive composition according to the first exemplary embodiment includes a rubber-based elastic component, the adhesive layer 150 may have excellent elasticity and elongation properties.

For example, the adhesive layer 150 may have an elasticity in a range of about 0.10 Mpa to about 0.30 Mpa; and an elongation index in a range of about 100% to about 300%. Further, the adhesive layer 150 may have a refractive index in a range of about 1.49 to about 1.53, a transmittance more than about 92%, and a glass transition temperature in a range of about −10° C. to about −5° C.

Hereinafter, another embodiment of the present disclosure directed to a method of manufacturing a display device 101 will described with reference to FIGS. 2A through 2D.

FIGS. 2A through 2D are process diagrams illustrating bonding of a display panel 110 to a window 130.

Figure 2A:
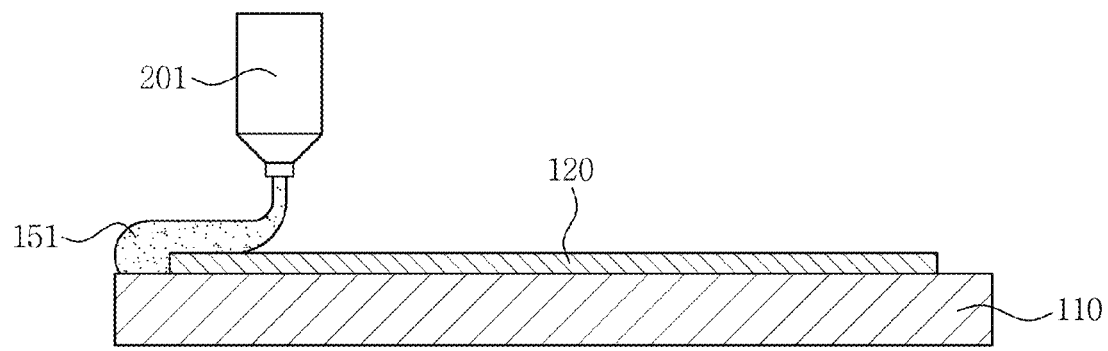
FIGS. 2A through 2D are process diagrams illustrating bonding of a display panel to a window.

First, an adhesive composition 151 may be coated on a surface of a display panel 110 on which a polarizing plate 120 is attached (FIG. 2A). In some embodiments, the adhesive composition 151 is an adhesive composition as disclosed and described herein. In order to coat the adhesive composition 151, a slit coater 201 may be used.

Figure 2B:
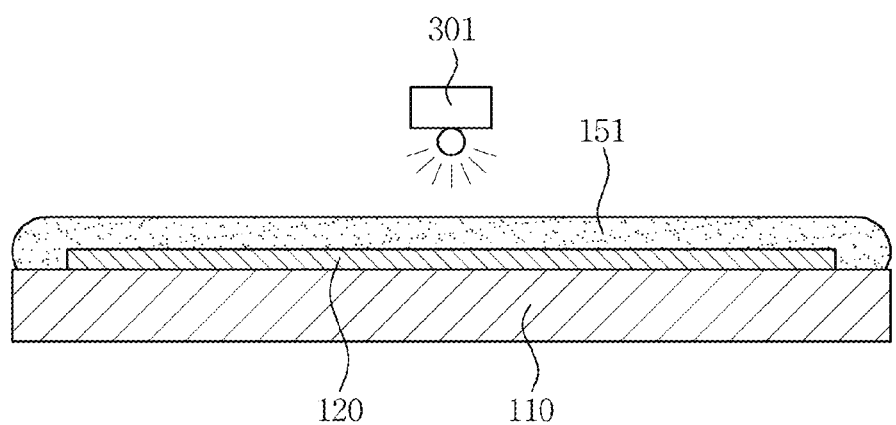

Next, a first curing of the adhesive composition 151 may be performed by a first light source 301 (FIG. 2B).

In some embodiments, the first light source 301 may emit ultraviolet rays having a wavelength in a range of about 350 nm to about 370 nm. For example, an LED lamp emitting ultraviolet rays having a wavelength of about 365 nm may be used as the first light source 301.

In some embodiments, the first curing of the adhesive composition 151 may be performed by ultraviolet rays (first photoirradiation) having a wavelength in a range of about 350 nm to about 370 nm (short wavelength). In the first photoirradiation, short wavelength ultraviolet rays having an intensity of about 200 mW may be irradiated on an entire surface of the adhesive composition 151. Such short wavelength ultraviolet rays may have a photo-energy of about 500 mJ/cm$^2$ to about 1000 mJ/cm$^2$. Such first curing of the adhesive composition 151 is called pre-curing.

During the pre-curing, a first photopolymerization initiator of the adhesive composition may be activated and reactive groups of the adhesive composition in an amount of about 70% to about 80% thereof may participate in the polymerization reaction. As the pre-curing is performed, a surface of a layer composed of the adhesive composition 151 may be cured, thereby forming a film.

With the pre-curing process, the interior portion of the adhesive composition 151 may maintain a gel state but a film may be formed on a circumferential surface of the adhesive composition 151, such that fluidity of the adhesive composition may be suppressed. Accordingly, the pre-cured adhesive composition 151 may be readily dealt with.

Figure 2C:
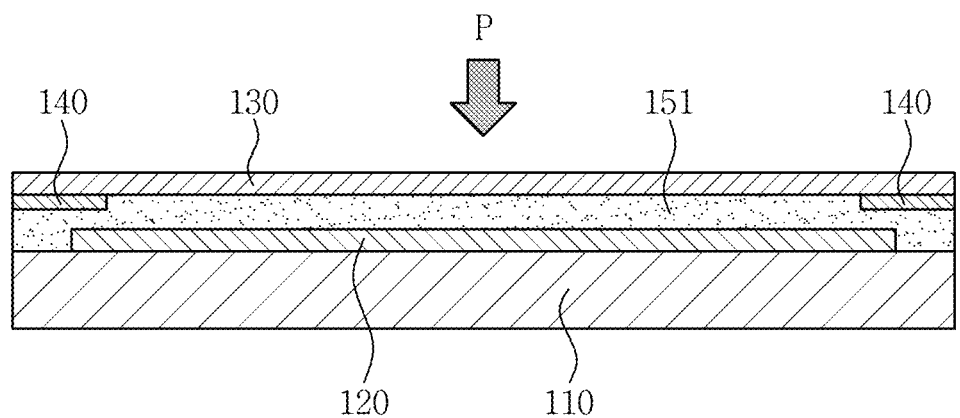

Next, a window 130 may be disposed on the pre-cured adhesive composition 151, and the window may be compressed toward the display panel 110. In this case, a predetermined pressure (P) may be applied to the window 130, and the display panel 110 and the window 130 may be bonded to each other (FIG. 2C).

Figure 2D:
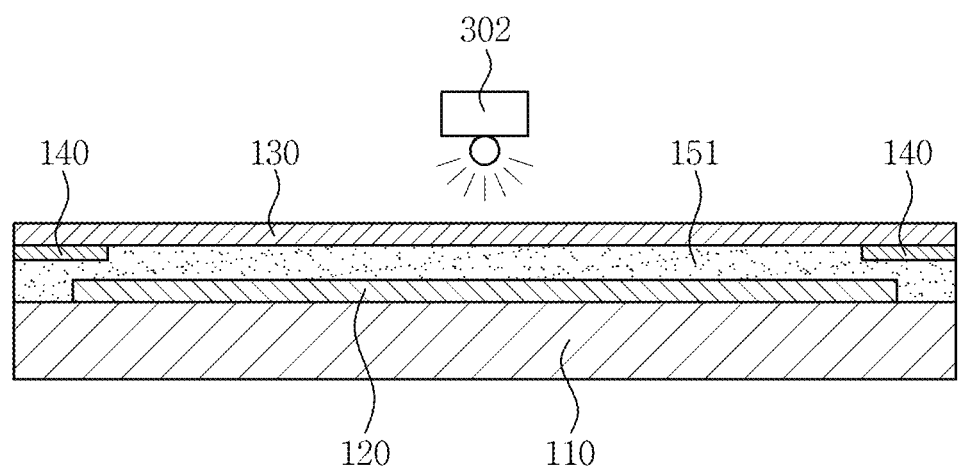

Subsequently, light may be irradiated on the window 130 by a second light source 302, and thus the pre-cured adhesive composition 151 may be subject to a second curing (FIG. 2D).

In some embodiments, the second light source 302 may emit light having a longer wavelength than that of the first light source 301. For example, the second light source 302 may emit ultraviolet rays having a wavelength in a range of about 380 nm to about 390 nm. In some embodiments, an LED lamp that emits ultraviolet rays having a long wavelength of about 385 nm may be used as the second light source 302.

In some embodiments, the second curing of the adhesive composition 151 may be performed by ultraviolet rays (second photoirradiation) having a wavelength in a range of about 380 nm to about 390 nm (long wavelength). In this case, light may be irradiated on the window 130, such that ultraviolet rays may be irradiated to the pre-cured adhesive composition 151 through the window 130. In the second photoirradiation, long wavelength ultraviolet rays having an intensity of about 200 mW may be irradiated on an entire surface of the adhesive composition 151. Such second curing of the adhesive composition 151 may be called main curing.

During the main curing, the second photopolymerization initiator of the adhesive composition may be activated and the rest of the reactive groups of the adhesive composition in an amount of about 20% to about 30% may participate in the polymerization reaction. Since the long wavelength ultraviolet ray, which shows superior penetration properties over the short wavelength ultraviolet ray, is used in the main curing, the photopolymerization initiator within the adhesive composition can be efficiently activated. As the main curing is performed, even the interior portion of the adhesive composition 151 is subject to the curing, thereby forming an adhesive layer 150.

When the display panel 110 and the window 130 are bonded to each other using the adhesive composition, pre-curing and main curing are generally performed together. In this case, since a circumferential surface undergoes curing in the pre-curing process while the interior portion undergoes curing in the main curing process, the speed of the main curing is slower than that of the pre-curing.

Figure 3A:
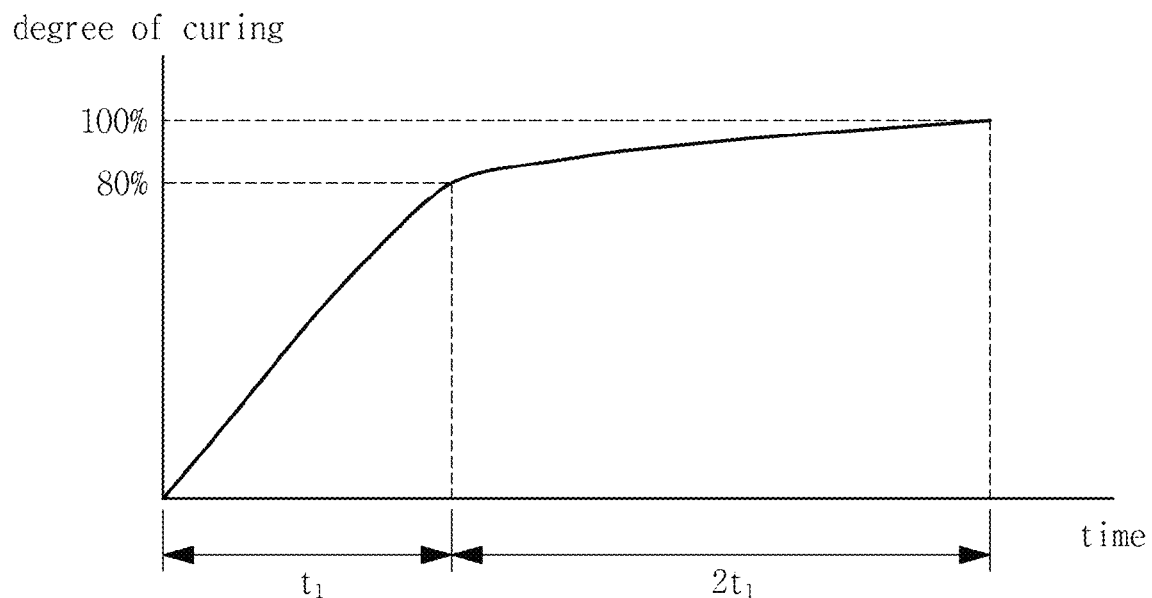
FIGS. 3A and 3B are graphs illustrating curing time and degree of curing of an adhesive composition according an embodiment.

FIG. 3A is a graph illustrating a curing time and a degree of curing of a conventional adhesive composition. In detail, FIG. 3A illustrates a curing time and a degree of curing when a light having a single wavelength is irradiated to an adhesive composition including a single photopolymerization initiator to perform a pre-curing and a main curing.

Herein, a degree of curing in a range of about 0% to 80% corresponds to the pre-curing, and a degree of curing in a range of about 80% to 100% corresponds to the main curing. As illustrated in FIG. 3A, a time taken for the main curing $2t_1$ may be generally twice a time $t_1$ taken for the pre-curing.

In contrast, the preceding embodiment provides an adhesive composition that may include a first photopolymerization initiator that is a short wavelength photopolymerization initiator and a second photopolymerization initiator that is a long wavelength photopolymerization initiator, such that the short wavelength ultraviolet rays may be utilized in the pre-curing process, and the long wavelength ultraviolet rays may be utilized in the main curing process. For example, according to the preceding embodiment, the long wavelength ultraviolet ray is used in the main curing process, which may easily penetrate into the interior portion of a layer composed of the adhesive composition, thereby allowing activation of the long wavelength photopolymerization initiator. Accordingly, the main curing of the adhesive composition may be readily performed, such that a total curing time of the adhesive composition may decrease as shown in FIG. 3B.

Figure 3B:
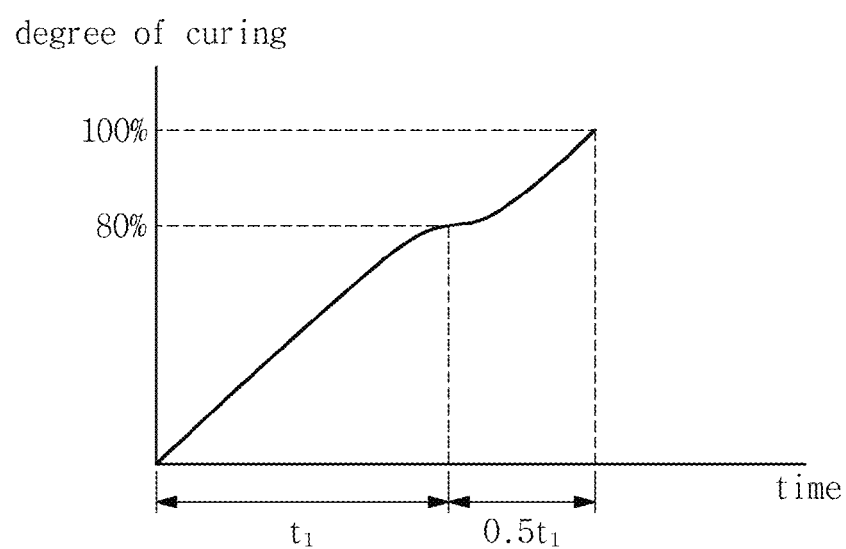

FIG. 3B is a graph illustrating a curing time and a degree of curing of the adhesive composition according to an embodiment including a first photopolymerization initiator that is a short wavelength photopolymerization initiator and a second photopolymerization initiator that is a long wavelength photopolymerization initiator. Referring to FIG. 3B, a time 0.5 $t_1$ taken for the main curing of the adhesive composition according an embodiment including a first photopolymerization initiator that is a short wavelength photopolymerization initiator and a second photopolymerization initiator that is a long wavelength photopolymerization initiator is shorter than a time $t_1$ taken for the pre-curing thereof. As set forth above, when the adhesive composition according to the embodiments provided herein is used, the curing efficiency may increase.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be combined to produce further embodiments consistent with the present teachings.

What is claimed is:

1. A display device comprising:
a display panel;
an adhesive layer on the display panel; and
a window on the adhesive layer,
wherein the adhesive layer comprises an adhesive polymer resin, a rubber-based elastic component, and a photopolymerization initiator, and
the photopolymerization initiator comprises a first photopolymerization initiator having a maximum absorption wavelength in a range of about 350 nm to about 370 nm and a second photopolymerization initiator having a maximum absorption wavelength in a range of about 380 nm to about 390 nm,
wherein the rubber-based elastic component is at least one selected from the group consisting of polybutadiene and polyisoprene that have a weight average molecular weight (Mw) in a range of about 10,000 Mw to about 100,000 Mw.

2. The display device of claim 1, wherein the adhesive layer has:
an elasticity in a range of about 0.10 Mpa to about 0.30 Mpa;
an elongation index in a range of about 100% to about 300%;
a refractive index in a range of about 1.49 to about 1.53;
a transmittance more than about 92%; and
a glass transition temperature in a range of about −10° C. to about -5° C.

3. The display device of claim 1, wherein the first photopolymerization initiator is represented by at least one of the following Chemical Formulas 1 through 3:

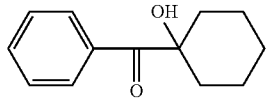

Chemical Formula 1

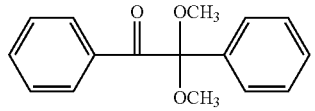

Chemical Formula 2

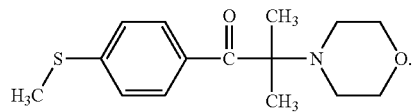

Chemical Formula 3

4. The display device of claim 1, wherein the second photopolymerization initiator is represented by the following Chemical Formula 4:

Chemical Formula 4

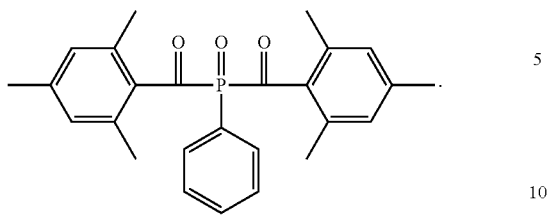

5. The display device of claim 1, wherein the rubber-based elastic component is at least one selected from the group consisting of polybutadiene and polyisoprene that have a weight average molecular weight (Mw) in a range of 10,000 Mw to 100,000 Mw.

6. The display device of claim 1, wherein the rubber-based elastic component is present in an amount of about 25 wt % to about 50 wt % with respect to the total weight of the adhesive layer.

* * * * *